United States Patent [15] 3,687,951
Humburger et al. [45] Aug. 29, 1972

[54] PROCESS FOR THE PREPARATION OF ISATOIC ANHYDRIDE

[72] Inventors: Siegbert Humburger, Leverkusen; Willi Hahn, Koeln-Stammheim, both of Germany

[73] Assignee: Farbenfabriken Bayer Aktiengesellschaft, Leverkusen, Germany

[22] Filed: May 19, 1969

[21] Appl. No.: 825,890

[30] Foreign Application Priority Data

May 20, 1968 Germany..........P 17 70 458.4

[52] U.S. Cl. ............................... 260/244 A, 260/518
[51] Int. Cl. ............................................. C07d 87/10
[58] Field of Search ................................. 260/244 A

[56] References Cited

UNITED STATES PATENTS 3,324,119  6/1967  Hill et al. ................ 260/244 A

FOREIGN PATENTS OR APPLICATIONS 127,138  12/1901  Germany ............... 260/244 A

OTHER PUBLICATIONS

Conant et al., The Chemistry of Organic Compounds, 3rd ed., p. 502, N.Y., MacMillan, 1947. QD251.C67
McKee In: Wiley Five- and Six- Membered Compounds with Nitrogen and Oxygen, p. 364, N.Y., Interscience- Wiley, 1962. QD401.F58

Primary Examiner—Natalie Trousof
Attorney—Burgess, Dinklage & Sprung

[57] ABSTRACT

Reacting, in a first step, an aqueous alkali metal salt solution of phthalic acid monoamide, optionally in admixture with phthalimide, under alkaline conditions with alkali metal hypochlorite, e.g., at a temperature of about −5° to +40° C., and adding all at once, in a second step, an amount of acid substantially equivalent to the alkali present in the solution to neutralize such alkali and form isatoic anhydride and thereby cause separation of the isatoic anhydride from the solution, said isatoic anhydride being a known intermediate for the preparation of plant protection agents and dyestuffs.

10 Claims, 2 Drawing Figures

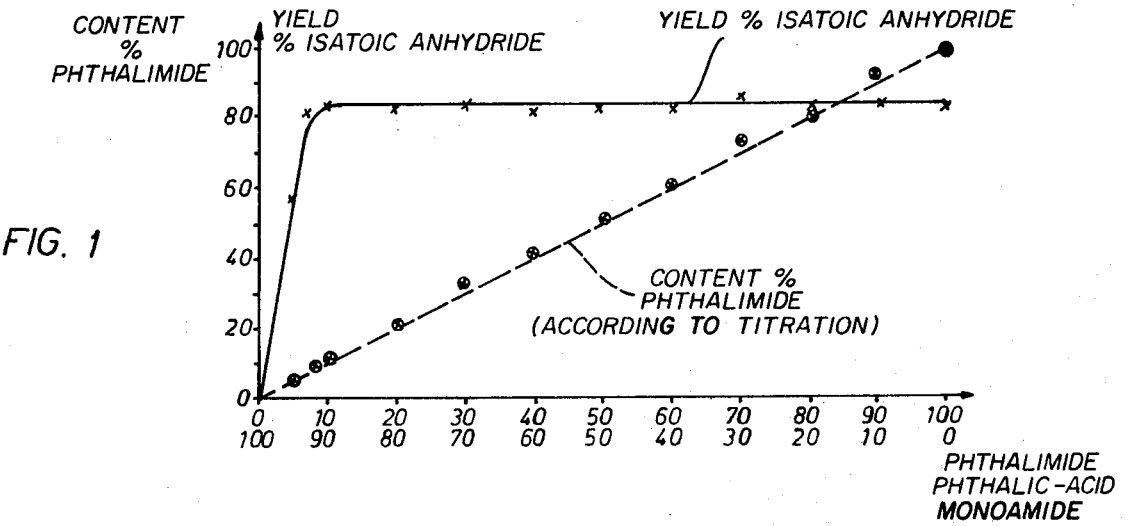
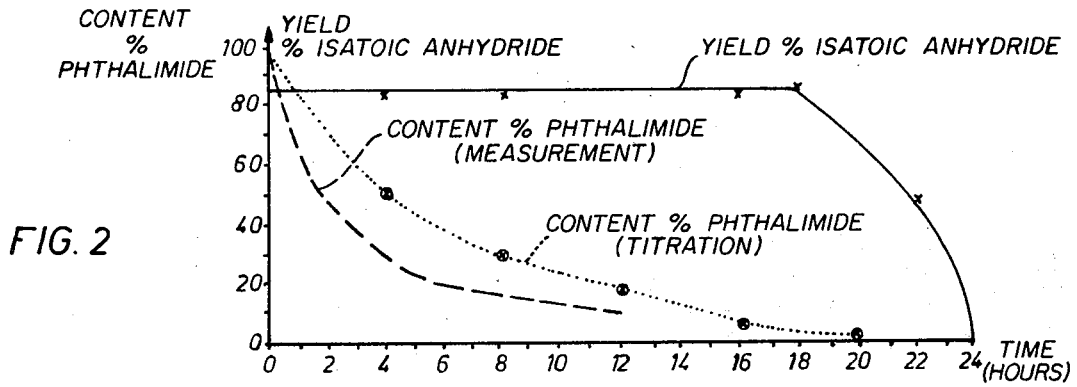

PROCESS FOR THE PREPARATION OF ISATOIC ANHYDRIDE

The present invention relates to and has for its objects the provision for particular new methods of reacting phthalic acid monoamide, optionally in admixture with phthalimide, i.e., in the form of the corresponding aqueous alkali metal salt solution under alkaline conditions, with alkali metal hypochlorite, and thereafter neutralizing with acid, whereby to produce isatoic anhydride, which is a known intermediate for organic syntheses, e.g., in a simple manner, using readily available starting materials and resulting in outstanding yields and purity, with other and further objects of the invention becoming apparent from a study of the within specification and accompanying examples.

It is known that phthalic acid monoamide (i.e., ortho-aminocarbonyl-benzoic acid) can be converted into anthranilic acid (ortho-amino-benzoic acid) by reaction with alkali metal hypochlorite in alkaline aqueous solution at elevated temperatures with an excess of alkali and without neutralizing the mixture according to the mechanism of the Hoffmann acid amide degradation. Anthranilic acid can, in turn, be reacted with phosgene to give isatoic anhydride, which is therefore accessible in this manner in a 2-step process.

On the other hand, German Pat. (Deutsches Reichspatent) No. 127,138 describes a method for the preparation of isatoic anhydride from phthalic acid imide (pthalimide) and hypochlorite without the use of phosgene. However, it is difficult, according to the particulars given in such German patent, to prepare isatoic anhydride reproducibly and in good yields, since the reaction is very complex and leads to the formation of by-products [see Mohr, Journal fur Praktische Chemie (2) 80, 1–31 (1909)]. Because of these difficulties, the process of German Pat. (Deutsches Reichspatent) No. 127,138 has not become established in industry.

More recently, a specific embodiment of said German Patent method of preparation has been proposed which comprises dissolving phthalic acid imide in aqueous solution of alkali to form the corresponding alkali phthalimide salt and then reacting such phthalimide salt immediately thereafter with alkali metal hypochlorite solution; a narrowly restricted pH range (i.e., acid pH) must be maintained by addition of acid (see U.S. Pat. No. 3,324,119).

This last-mentioned process, however, only affords good yields if the phthalimide salt is still present in substantially unchanged from in the starting mixture upon the reaction with the alkali metal hypochlorite solution. According to such U.S. Pat. No. 3,324,119, the presence of at least 50 percent, and for the achievement of good yields at least 80 percent, of unchanged phthalimide salt is necessary in the reaction mixture. It will be realized that the reaction of the phthalimide salt solution must be effected immediately after it has been prepared because such salt is readily hydrolyzed to phthalic acid monoamide at the inherently alkaline pH value of the aqueous salt solution in question.

It has now been found, in accordance with the present invention, that a versatile and smooth process may be provided for the production in favorably higher yields and higher purity of isatoic anhydride, in a technologically simple manner and without the use of phosgene, which comprises reacting, in a first step, an aqueous alkali metal salt solution of phthalic acid monoamide, i.e., aqueous alkali metal phthalic acid monoamide salt solution, optionally in admixture with phthalimide, under alkaline conditions, i.e., at alkaline or basic pH-range above 10, preferably above 12 with alkali metal hypochlorite and adding all at once, in a second step, an amount of acid approximately, e.g., substantially, equivalent to the alkali present in the solution, to neutralize such alkali, whereby the isatoic anhydride separates out of the solution and may be recovered.

It is most surprising that, by means of the instant process, isatoic anhydride can be obtained in good yields. From the teachings of said U.S. Pat. No. 3,324,119, it would have been expected that solutions of alkali metal salts of phthalic acid monoamide would not be suitable for the preparation of isatoic anhydride by reaction with alkali metal hypochlorite under alkaline conditions. From the other prior art mentioned above, it would have been expected that such solutions would have to be degraded with alkali metal hypochlorite to give anthranilic acid.

One of the chief advantages of the production process of the present invention as compared with the prior art is that it is not necessary to take complicated and expensive precautions to ensure that the starting material, e.g., phthalimide salt, is unchanged. Such precautions are especially necessary in the known process according to said U.S. Pat. No. 3,324,119 where the presence of a substantial proportion of phthalic acid monamide in the phthalimide is said to prevent a reasonable yield, and where such presence is very likely, in the absence of such precautions, because phthalic acid imide is readily hydrolyzed in alkaline-aqueous solution.

In carrying out the production process of the present invention, one can start advantageously from pre-formed phthalic acid monoamide solutions, or one can use phthalic acid imide solutions without having to take into account their degree of hydrolysis. This has considerable technological and economic advantages, since it is very difficult to so dissolve phthalic acid imide in stoichiometric amounts of solution of alkali, and to so handle such solution, that no, or only slight, hydrolysis occurs.

This becomes understandable when the hydrolysis speeds are considered: according to U.S. Pat. No. 3,324,119, a sodium phthalimide solution is hydrolyzed to the extent of 10 percent after 35 minutes at 0° C., and after only 2 minutes at 30° C. A 50 percent hydrolysis, and thus uselessness of the solution for the process of U.S. Pat. No. 3,324,119, results after only 120 minutes at 0° C., or after only 23 minutes at 30° C.

The starting alkali metal salt solutions of phthalic acid monoamide (optionally in admixture with phthalimide) which are suitable for the production process according to the present invention can be prepared by various known methods, as the artisan will appreciate. Thus, phthalic anhydride can be reacted with ammonia in aqueous-alkaline medium to give the monoamide, which is obtained as the corresponding alkali metal salt solution. Also, phthalic acid imide dissolves in aqueous alkali metal solutions with the formation of the appropriate alkali metal salts which, as mentioned above, are subject at the alkaline pH of the solution to a rapid hydrolysis to give the monoamide. For economic reasons, the sodium salt is preferably used although of course corresponding salt solutions of other alkali metals (e.g., potassium, lithium, etc.) are also usable.

Alkali metal hypochlorite solutions which are usable in the instant process advantageously may be cheap commercial grade products which, in the simplest case, are obtained from chlorine and alkali metal hydroxide. Here again, the inexpensive sodium compound is of chief interest, although potassium, lithium, etc, hypochlorite solutions are also usable.

A minimum proportion of the alkali, i.e., alkali metal, present in the initial mixture compared with the phthalic acid monoamide or imide is essential for the success of the alkali metal hypochlorite reaction. There must be present at least 0.9 mol, preferably about 1.0–1.5 mols, of alkali metal hydroxide (e.g., NaOH, KOH, LiOH, etc.) per mol of the monoamide or imide. However, larger amounts of alkali metal hydroxide may also be favorable, particularly when pure monoamide is used, for example up to about 4 mols per mol of monoamide or imide. In general, substantially between about 0.9–4 mols of alkali, i.e., alkali metal hydroxide, are used per mol of the monoamide or imide.

Advantageously, the alkali metal hydroxide to be used may, in part, be present in the amide solution or imide solution and the other part may be added with the alkali metal hypochlorite solution.

The amount of acid used in the second step according to the process of the present invention must be approximately equivalent to the amount of alkali present for desired neutralization, as the artisan will appreciate. To achieve good yields, only slight deviations from the equivalent amount are admissible, for example up to about 10 percent less or an excess of about 5 percent, i.e., mol percent. In general, substantially between about 0.9 to 1.05 mol equivalents of acid per mol of alkali, i.e., alkali metal hydroxide present, should be used. The addition of still more acid should be avoided. The nature of the acid has, as such, no decisive influence on the course of the reaction, just its role as neutralizing agent. For economic reasons, strong mineral or inorganic acids, for example sulfuric acid, hydrochloric acid, nitric acid, phosphoric acid, or the like, are generally used.

The composition of the solution of phthalic acid monoamide or its mixture with phthalimide can be varied within wide limits. It is surprising and an important feature of the present invention that even monoamide solutions with an exceptionally low proportion of phthalimide can be reacted to give the same yields of isatoic anhydride which according to the prior art are said to be attainable only with pure or very slightly hydrolyzed imide solutions. In this regard, it has proved advantageous to use alkali metal salt solutions of mixtures of phthalic acid monoamide and phthalimide with a content of phthalimide of substantially between about 5–50 percent, in particular between about 10–30 mol percent of the mixture, the remainder being correspondingly 95–50 percent, in particular 90–70 mol percent of the monoamide.

FIG. 1 shows graphically the dependence of the yields of isatoic anhydride on the composition of the starting solutions.

FIG. 2 shows graphically the fact that alkaline phthalimide solutions in the sense of the present invention can be stored advantageously over longer periods before the reaction with alkali metal hypochlorite, without lessening of the yield. The graph of FIG. 2 shows the variation of the yield with time (in hours), as well as the variation of the degree of hydrolysis of the phthalimide solution with time. The isatoic anhydride is prepared by following the procedure according to Example 2. The hydrolysis curve was determined according to the particulars given in said U.S. Pat. No. 3,324,119, and by an ultra-violet radiation method.

The duration of the first step of the production process of the present invention is important. It is closely coupled with the reaction temperature. To avoid side reactions, the reaction is expediently carried out at low temperature. A lower limit is given by the freezing temperature of the solution or the temperature at which alkali metal salts crystallizing out would make the process industrially impractical. Since the reaction is strongly exothermic, the maintenance of a low temperature makes cooling necessary. The upper temperature limit depends in practice on the degree of cooling which can be effected. Taking these facts into account, a temperature range of substantially between about $-5°$ to about $+40°$ C. may be regarded as suitable. High temperatures imply short reaction times, lower temperatures require longer reaction times. For the temperature range from about 0° to 20° C., for instance, residence periods of correspondingly about 10 minutes to about 10 seconds have proved suitable, as specifically disclosed in Example 5.

The second step of the production process according to the present invention serves for the completion of the reaction and for the separation of the isatoic anhydride in solid form. The temperature during and after the addition of the equivalent amount of acid may be varied between wide limits. The range from substantially between about 10° C. to about 80° C., particularly from about 25° to 50° C., has proved suitable. Here, too, the reaction time depends on the temperature. In the lower part of the range mentioned, about half an hour may be necessary for the complete separation of the isatoic anhydride. At higher temperatures, this time shortens to a few minutes, e.g., about 5 minutes. Since the separated isatoic anhydride is relatively stable under the reaction conditions, it may, especially when the lower part of the temperature range is used, remain in the reaction mixture for a longer period before isolation, for example for about 3–5 hours.

The production process of the present invention can, in principle, be carried out batch-wise or continuously. The exact observance of the reaction conditions, especially the temperatures and residence periods, which is a precondition for the attainment of good yields, can best be accomplished with continuous working methods. Continuous operation is therefore preferred for the industrial working of the process. Such continuous operation may be effected by a method in which the aqueous alkali metal salt solution of phthalic acid monoamide, optionally in admixture with phthalimide salt, is conveyed from a storage container by means of a metering pump into a mixing chamber at the desired rate and, simultaneously, the appropriate amount of an alkali metal hypochlorite solution which may contain alkali metal hydroxide is continuously metered in. After the mixing chamber there follows a residence zone in which the mixture can react in the sense of the first step of the process according to the present invention. By adapting the throughput amounts to the dimensions of the reaction chamber, the average residence period necessary in the alkaline range can be exactly adjusted. Beyond this reaction zone, addition of acid takes place in the sense of the second step of the instant process, again continuously and adapted to the amount of alkali present. The acid mixing apparatus may comprise for example, a stirrer vessel or a circulating apparatus which is so dimensioned that the residence time required for the complete separation of the isatoic anhydride formed is achieved. The isatoic anhydride obtained as suspension can then be filtered batch-wise or continuously by known methods. It is obtained in a readily filterable form which is easy to wash free from salt and can, in general, be immediately used for any further processing.

An important advantage of this continuous form of operation is that one can use phthalic acid monoamide salt solutions or a mixture with phthalimide salt with relatively low phthalimide content. These solutions can without further operations be used as stock solutions; whereas the high-grade phthalimide salt solutions necessary for the process of said U.S. Pat. No. 3,324,119 cannot, or can only with considerable expense, be held in stock, since even during the process of dissolving, and during storage, even at low temperature, considerable hydrolysis occurs as discussed above.

The isatoic anhydride which can be prepared according to the present invention in a technologically simple manner with good yields and high purity is a valuable intermediate for organic syntheses, for example for the preparation of plant protection agents and dyestuffs, as the artisan will appreciate.

Thus, the present invention contemplates, in particular, a process for the production of isatoic anhydride which comprises reacting, in a first step, an aqueous alkali metal salt solution of a member selected from the group consisting of phthalic acid monoamide, and a mixture of phthalic acid semi-amide and phthalimide, in the presence of substantially between about 0.9 – 4 mols of alkali metal hydroxide per mol of said member, with alkali metal hypochlorite at a temperature substantially between about −5° to +40° C., and adding all at once, in a second step, substantially between about 0.9 to 1.05 mol equivalents of mineral acid per mol of alkali metal hydroxide present in the solution at a temperature substantially between about 10° to 80° C. to neutralize such alkali metal hydroxide, whereby such isatoic anhydride forms and precipitates from the solution.

Preferably, the first step is carried out at a temperature substantially between about 0° to 20° C. for a residence period of correspondingly between about 10 minutes to 10 seconds.

In particular, the aqueous alkali metal salt solution is a solution of a member selected from the group consisting of phthalic acid monoamide, and a mixture of 95–50 mol percent phthalic acid monoamide and 5–50 mol percent phthalimide. Furthermore, especially advantageous from an economical standpoint is the case where the aqueous alkali metal salt solution is the corresponding sodium salt solution, the hypochlorite is sodium hypochlorite, the alkali metal hydroxide is sodium hydroxide, and the acid is a mineral acid such as hydrochloric and/or sulfuric acid.

The production process of the present invention is illustrated, without limitation, by the following examples.

EXAMPLE 1a

[Sodium phthalic acid monoamide]

148.1g (1 mol) phthalic anhydride are added to a warm (30° C.) mixture of 174.5 ml of water and 159 ml (2.12 mols) of 25 percent aqueous ammonia solution. When all the anhydride is dissolved (pH 7), cooling to 50° C. is effected and a further 148.1g (1 mol) of phthalic anhydride are added. Thereafter, 110.5 ml of 48 percent aqueous NaOH (2 mols) are added. The temperature rises to over 90° C. and a clear solution of pH 9 is obtained. Cooling to 10° C. is then effected.

EXAMPLE 1b

[Isatoic anhydride]

A mixture of 144.5g (0.2 mol) of hypochlorite solution with 10.3 percent NaOCl and 0.55 percent NaOH and 120 ml (0.6 mol) aqueous solution of sodium hydroxide with 200 g/l NaOH is added dropwise in 3 minutes at 10° C., with stirring, to 140.7g of an aqueous solution with 37.4g (0.2 mol) sodium phthalic acid monoamide and 0.4g (0.01 mol) NaOH prepared according to Example 1a above. 130 ml (0.713 mol) of aqueous hydrochloric acid with 200 g/l HCl are then added in one pouring; heating to 35° C. is effected, followed by stirring for 30 minutes. This is followed by suction filtration, washing, and drying for 10 hours at 50°–55 C.

Yield: 22.6g with 96.2 percent (purity) isatoic anhydride corresponding to 67 percent of the theory.

EXAMPLE 2

29.4g (0.2 mol) phthalimide are dissolved during 10 minutes at 10° C. in 110 ml (0.22 mol) 2N aqueous solution of sodium hydroxide. The mixture is then left to stand for 16 hours at 3° C. In this solution, 5 percent phthalimide is determined by titration, the remainder being phthalic acid monoamide. 92.5 ml (0.2 mol) hypochlorite solution with 161 g/l NaOCl and 7.9 g/l NaOH are then added dropwise in 5 minutes at 10° C. and 116 ml (0.119 mol) of aqueous sulfuric acid with 100 g/l $H_2SO_4$ are subsequently added in one pouring and the same procedure is followed as in Example 1b. Yield: 27.6g with 97.6 percent (purity) isatoic anhydride corresponding to 82.6 percent of the theory.

EXAMPLE 3

2.94g (0.02 mol) phthalimide freshly dissolved at 3° C. in 11 ml of 2N aqueous solution of sodium hydroxide are added to 118.35 ml of an aqueous solution with 33.6g (0.18 mol) sodium phthalic acid monoamide (prepared as in Example 1a). 11 percent phthalimide is determined by titration. Further work is then carried out as in Example 2. Yield: 28.4g with 96.5 percent (purity) isatoic anhydride corresponding to 84 percent of the theory. The same yield is obtained by using a mixture of 0.06 mol of sulfuric acid and 0.1 mol of hydrochloric acid.

EXAMPLE 4

14.7g (0.1 mol) phthalimide freshly dissolved at 3° C. in 55 ml of 2N aqueous NaOH are added to 65.75 ml of an aqueous solution with 18.7g (0.1 mol) sodium phthalic acid monoamide (prepared as in Example 1a). 52 percent phthalimide is determined by titration. Further work is then carried out as in Example 2. Yield: 28.8g with 93.5 percent (purity) isatoic anhydride corresponding to 82.1 percent of the theory.

EXAMPLE 5

Phthalimide is dissolved in 2N aqueous solution of sodium hydroxide (5–10 percent excess) in a stirrer vessel during a period of 20 minutes at 20°–25° C., and the aqueous solution is cooled to 3° C. in the course of about 1 hour. About 40 percent of the phthalimide is hydrolyzed in the solution. After a further 3 hours (about 65 percent phthalimide hydrolyzed), the liquid is passed into a mixing apparatus into which the equivalent amount of a cold (3° C.) hypochlorite solution (with 14 percent NaOCl and 0.6 percent NaOH) is continuously metered by means of a metering pump. Pumping in lasts 4 hours; during this time up to about 85 percent of the phthalimide is hydrolyzed. The reaction mixture passes from the mixing chamber through a cooled residence zone in which, with a residence period determined by the throughput amounts in a limited temperature range, the reaction heat of the first process step is removed. The water-white solution runs into a stirrer vessel in which neutralization is effected by continuous metering in of an equivalent amount of 10 percent aqueous $H_2SO_4$ in the second step of the process. By recycling, regulated by means of a level indicator, the warm (about 40° C.) suspension of isatoic anhydride is continuously discharged onto a suction filter. There is thus achieved an average residence period of about 1 hour in the neutralization vessel. After brief after-washing, the moist isatoic anhydride can be further processed. The content is determined by diazotization before and after hydrolysis.

In the following Table are listed the pure yields at various residence periods and temperatures of the first process step. They were obtained in a semi-industrial experimental apparatus with a throughput of 13 kg/hour.

TABLE

| Residence period | Temperature °C | Yield % isatoic anhydride |
|---|---|---|
| 5 min. | 6°C | 87.6% |
| 4 min. | 4°C | 87.4% |
| 4 min. | 6°C | 87.7% |
| 4 min. | 8°C | 86.1% |
| 4 min. | 10°C | 86.0% |
| 4 min. | 12°C | 82.0% |
| 2.9 min. | 8°C | 85.9% |
| 52.5 sec. | 4°C | 93.5% |
| 52.5 sec. | 8°C | 85.6% |
| 52.5 sec. | 12°C | 91.5% |
| 52.5 sec. | 16°C | 87.6% |

It will be appreciated that the instant specification and examples are set forth by way of illustration and not limitation, and that various modifications and changes may be made without departing from the spirit and scope of the present invention.

What is claimed is:

1. In the production of isatoic anhydride wherein an aqueous solution of an alkali metal salt of phthalic acid monoamide is reacted with an alkali metal hypochlorite to form the corresponding isocyanate and an acid is employed to convert the isocyanate to isatoic anhydride, the improvement which comprises effecting the reaction with hypochlorite at a pH above about 10 in the presence of an excess of alkali metal hydroxide up to 4 mols per mol of said monoamide, and adding the acid all at once in a subsequent step and in an amount substantially equivalent to the alkali present in the solution to neutralize such alkali whereby isatoic anhydride separates out from the solution.

2. Process according to claim 1 wherein said acid addition is carried out with substantially between about 0.9 to 1.05 mol equivalents of acid per mol of alkali present in the solution.

3. Process according to claim 1 wherein said acid addition is carried out at a temperature substantially between about 10° to 80° C.

4. Process according to claim 1 wherein said reaction is carried out at a temperature substantially between about 0° to 20° C. for a residence period of correspondingly between about 10 minutes to 10 seconds.

5. Process according to claim 1 wherein said process is carried out continuously.

6. Process according to claim 1 wherein said alkali metal phthalic acid monoamide salt is the corresponding sodium salt, said alkali metal hypochlorite is sodium hypochlorite, said alkaline conditions are maintained by the presence of sodium hydroxide as alkali, and said acid is mineral acid.

7. Process according to claim 6 wherein said acid is selected from the group consisting of hydrochloric acid, sulfuric acid and mixtures thereof.

8. Process according to claim 1 wherein said reaction is effected at above 12 with alkali metal hypochlorite at a temperature substantially between about −5° to +40° C. and said acid addition is effected with between about 0.9 to 1.05 mol equivalents of mineral acid per mol of alkali metal hydroxide present in the solution at a temperature substantially between about 10° to 80° C.

9. Process according to claim 8 wherein said reaction is carried out at a temperature substantially between about 0° to 20° C. for a residence period of correspondingly between about 10 minutes to 10 seconds.

10. Process according to claim 1 wherein said aqueous alkali metal salt solution is the corresponding sodium salt solution, said alkali metal hypochlorite is sodium hypochlorite, said alkali metal hydroxide is sodium hydroxide, and said mineral acid is selected from the group consisting of hydrochloric acid and sulfuric acid.

* * * * *